United States Patent [19]

Sagane et al.

[11] Patent Number: 5,142,007

[45] Date of Patent: Aug. 25, 1992

[54] PROCESS FOR THE PRODUCTION OF CYCLOOLEFIN-BASED RANDOM COPOLYMER

[75] Inventors: Toshihiro Sagane, Hatsukaichi; Toshiaki Kuroiwa, Yamaguchi; Shuji Minami, Ichihara, all of Japan

[73] Assignee: Mitsui Petrochemical Industries, Ltd., Tokyo, Japan

[21] Appl. No.: 735,116

[22] Filed: Jul. 24, 1991

Related U.S. Application Data

[63] Continuation of Ser. No. 665,238, Mar. 6, 1991, abandoned.

[30] Foreign Application Priority Data

Mar. 8, 1990 [JP] Japan ................................ 2-57282

[51] Int. Cl.$^5$ ................................................ C08F 2/06
[52] U.S. Cl. ................................ 526/169.2; 526/144; 526/280; 526/281; 526/903
[58] Field of Search .................. 526/169.2, 281, 144, 526/280, 903, 282

[56] References Cited

U.S. PATENT DOCUMENTS

| | | | |
|---|---|---|---|
| 4,614,778 | 9/1986 | Kajiura et al. | 526/281 |
| 4,931,520 | 6/1990 | Yamanashi et al. | 526/281 |
| 4,948,856 | 8/1990 | Minchak et al. | 526/281 |
| 5,003,019 | 3/1991 | Ishimaru et al. | 526/281 |

FOREIGN PATENT DOCUMENTS

| | | |
|---|---|---|
| 0203799 | 12/1986 | European Pat. Off. |
| 0291970 | 11/1988 | European Pat. Off. |
| 0310394 | 4/1989 | European Pat. Off. |
| 0325260 | 7/1989 | European Pat. Off. |

OTHER PUBLICATIONS

Chemical Abstracts, vol. 111, No. 20, Nov. 13, 1989.
Patent Abstracts of Japan, vol. 12, No. 82, Mar. 15, 1988.
Patent Abstracts of Japan, vol. 10, No. 276, Sep. 19, 1986.

*Primary Examiner*—Fred Teskin
*Attorney, Agent, or Firm*—Sherman and Shalloway

[57] ABSTRACT

A process for the production of a cycloolefin-based random copolymer, which comprises:

(A) copolymerizing (a) ethylene and (b) at least one cycloolefin, (B) in the presence of a catalyst comprising a vanadium compound soluble in a mixed solvent described below and an organoaluminum compound.

(C) in a mixed solvent comprising (a) a hydrocarbon-based solvent having a solubility parameter ($\delta$ value) of not less than 7.7 $(cal/cm^3)^{\frac{1}{2}}$ and (b) a hydrocarbon-based solvent having a solubility parameter ($\delta$ value) of not more than 7.5 $(cal/cm^3)^{\frac{1}{2}}$, the mixed solvent having a volume ratio (a)/(b) of 90/10 to 50/50. The said process permits the production of a copolymer in a higher concentration when copolymers having an identical molecular weight to that of conventional copolymers are produced, and permits the production of a copolymer having a higher molecular weight when copolymers are produced in an identical concentration to that of conventional copolymers.

11 Claims, No Drawings

PROCESS FOR THE PRODUCTION OF CYCLOOLEFIN-BASED RANDOM COPOLYMER

This application is a continuation of application Ser. No. 07/665,238, filed Mar. 6, 1991 now abandoned.

The present invention relates to a process for the production of a cycloolefin-based random copolymer. More specifically, the present invention relates to a process for the production of a cycloolefin-based random copolymer, which permits the production of a cycloolefin-based random copolymer having a high molecular weight at high yields.

A cycloolefin-based random copolymer comprising ethylene and a specific bulky cycloolefin is a synthetic resin having well-balanced properties among optical properties, mechanical properties, thermal properties, and the like. Such a cycloolefin-based random copolymer is used, for example, in fields of an optical material for optical memory disks, optical fibers, etc.

The above cycloolefin-based random copolymer is produced by copolymerizing ethylene and a cycloolefin in the presence of a catalyst comprising a soluble vanadium compound and an organoaluminum compound by the use, as a solvent, of a hydrocarbon such as toluene, cyclohexane, hexane, heptane, etc., or an identical cycloolefin to the above.

However, when one of hydrocarbon solvents such as toluene, cyclohexane, etc., which are all good solvents for an ethylene-cycloolefin copolymer to be formed and have a solubility parameter ($\delta$ value) of not less than 7.7 $(cal/cm^3)^{\frac{1}{2}}$, is used to copolymerize ethylene and a cycloolefin in order to produce a cycloolefin-based random copolymer in a high concentration, e.g. in a concentration of above 80 g/lit., the resultant polymerization system sometimes shows too high a viscosity to remove polymerization heat, it is sometimes difficult to maintain the monomer components in the system uniformly, or the movability of polymerization liquids is sometimes degraded.

On the other hand, when one of hydrocarbon solvents such as hexane, heptane, etc., which are poor solvents for an ethylene-cycloolefin copolymer to some extent and have a solubility parameter ($\delta$ value) of not more than 7.5 $(cal/cm^3)^{\frac{1}{2}}$, is used to copolymerize ethylene and a cycloolefin in order to produce a cycloolefin-based random copolymer in a high concentration, there is sometimes a problem in movability of polymerization liquids, or the resultant copolymer is sometimes not uniform in composition.

As described above, conventional processes sometimes have difficulty in producing the above copolymer having a uniform composition in a high concentration, and in particular it is difficult to produce a copolymer having a high molecular weight in a high concentration.

It has been therefore desired to develop an efficient process for the production of a cycloolefin-based random copolymer by copolymerizing ethylene and a cycloolefin, which can prevent an increase in viscosity of the polymerization system, which permits the production of a copolymer in a higher concentration when copolymers having an identical molecular weight to that of conventional copolymers are produced, and which permits the production of a copolymer having a higher molecular weight when copolymers are produced in an identical concentration to that of conventional copolymers.

It is therefore an object of the present invention to provide a novel process for the production of a cycloolefin-based random copolymer.

It is another object of the present invention to provide a process for efficiently producing a cycloolefin-based random copolymer in a high concentration.

It is further another object of the present invention to provide a process for efficiently producing a cycloolefin-based random copolymer in a higher concentration than that in conventional processes when the resultant copolymer has an identical molecular weight to that of copolymers according to conventional processes.

It is yet another object of the present invention to provide a process for producing a cycloolefin-based random copolymer having a higher molecular weight than that in conventional processes when the resultant copolymer has an identical concentration to that of copolymers according to conventional processes.

Further objects and advantages of the present invention will be apparent from the following description.

According to the present invention, the above objects and advantages can be achieved by a process for the production of a cycloolefin-based random copolymer, which comprises:
(A) copolymerizing (a) ethylene and (b) at least one cycloolefin selected from the group consisting of an unsaturated monomer of the formula (I)

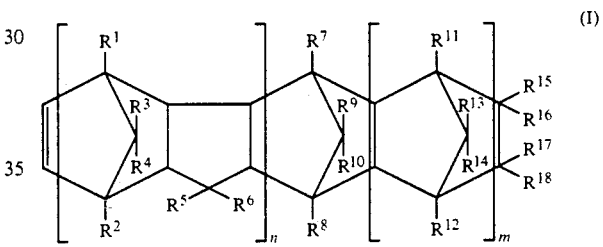

wherein
n is 0 or 1,
m is 0 or a positive integer,
each of $R^1$ to $R^{18}$ is independently a hydrogen atom, a halogen atom or a hydrocarbon group, two of $R^{15}$ to $^{18}$ may be bonded to each other to form a monocyclic or polycyclic ring which may have a double bond, and
$R^{15}$ and $R^{16}$, or $R^{17}$ and $R^{18}$, may together form an alkylidene group, and
an unsaturated monomer of the formula (II)

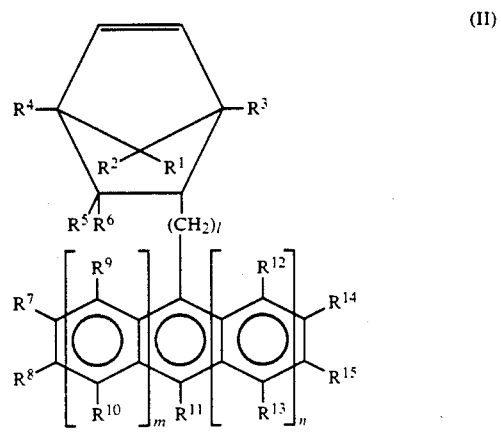

wherein
l is 0 or an integer of not less than 1,
m and n are 0, 1 or 2,
each of $R^1$ to $R^{15}$ is independently a hydrogen atom, a halogen atom, an aliphatic hydrocarbon group, an aromatic hydrocarbon group or an alkoxy group, and $R^5$ (or $R^6$) and $R^9$ (or $R^7$) may be bonded to each other through an alkylene group having 1 to 3 carbon atoms or may be bonded to each other directly through no group, (B) in the presence of a catalyst comprising a vanadium compound soluble in a mixed solvent described below and an organoaluminum compound.

(C) in a mixed solvent comprising (a) a hydrocarbon-based solvent having a solubility parameter ($\delta$ value) of not less than 7.7 $(cal/cm^3)^{\frac{1}{2}}$ and (b) a hydrocarbon-based solvent having a solubility parameter ($\delta$ value) of not more than 7.5 $(cal/cm^3)^{\frac{1}{2}}$, the mixed solvent having a volume ratio (a)/(b) of 90/10 to 50/50.

As described above, the present invention uses a mixed solvent prepared from at least two hydrocarbons each having the above-specified solubility parameter when ethylene and a cycloolefin are copolymerized, whereby a decrease in viscosity of the polymerization system can be achieved. And, a copolymer can be produced in a higher concentration when the copolymer has the same molecular weight as those of conventional copolymers, and a copolymer having a higher molecular weight can be produced when the copolymer has the same polymer concentration as those of conventional copolymers.

The process for the production of the cycloolefin-based random copolymer of the present invention will be specifically described below.

In the present invention, the cycloolefin-based random copolymer is produced by copolymerizing a cycloolefin of the formula (I) or (II) and ethylene in a solvent of at least two specific hydrocarbons in the presence of a catalyst comprising a vanadium compound soluble in said solvent and an organoaluminum compound.

The cycloolefin of the formula (I) can be selected from:
bicyclo[2.2.1.]hept-2-enes,
tetracyclo[4.4.0.1$^{2.5}$.1$^{7,10}$]-3-dodecenes,
hexacyclo[6.6.1.1$^{3,6}$.1$^{10,13}$.0$^{2,7}$.0$^{9,14}$]-4-heptadecenes,
octacyclo[8.8.0.1$^{2,9}$.1$^{4,7}$.1$^{11,18}$.1$^{13,16}$.0$^{3,8}$.0$^{12,17}$]-5-docosenes,
pentacyclo[6.6.1.1$^{3,6}$.0$^{2,7}$.0$^{9,14}$]-4-hexadecenes,
heptacyclo-5-eicosenes,
heptacyclo-5-heneicosenes,
tricyclo[4.3.0.1$^{2,5}$]-3-decenes,
tricyclo[4.4.0.1$^{2,5}$]-3-undecenes,
pentacyclo[6.5.1.1$^{3,6}$.0$^{2,7}$.0$^{9,13}$]-4-pentadecenes,
pentacyclopentadecadienes,
pentacyclo[4.7.0.1$^{2,5}$.0$^{8,13}$.1$^{9,12}$]-3-pentadecenes,
heptacyclo[7.8.0.1$^{3,6}$.0$^{2,7}$.1$^{10,18}$.0$^{11,16}$.1$^{12,15}$]-4-eicosenes, and
nonacyclo[9.10.1.1$^{4,7}$.0$^{3,8}$.0$^{2,10}$.0$^{12,21}$.1$^{13,20}$.0$^{14,19}$.1$^{15,18}$]-5-pentacosenes.

Specific examples of such compounds are as follows.
Bicyclo[2,2,1]hept-2-enes:
bicyclo[2,2,1]hept-2-ene

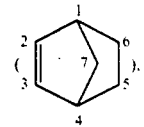

6-methylbicyclo[2,2,1]hept-2-ene,
5,6-dimethylbicyclo[2,2,1]hept-2-ene,
1-methylbicyclo[2,2,1]hept-2-ene,
6-ethylbicyclo[2,2,1]hept-2-ene
6-n-butylbicyclo[2,2,1]hept-2-ene,
6-isobutylbicyclo[2,2,1]hept-2-ene, and
7-methylbicyclo[2,2,1]hept-2-ene.
Tetracyclo[4.4.0.1$^{2,5}$.1$^{7,10}$]-3-dodecenes:
tetracyclo[4.4.0.1$^{2,5}$.1$^{7,10}$]-3-dodecene

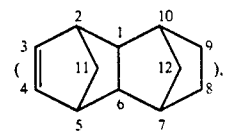

5,10-dimethyltetracyclo[4.4.0.1$^{2,5}$.1$^{7,10}$]-3-dodecene,
2,10-dimethyltetracyclo[4.4.0.1$^{2,5}$.1$^{7,10}$]-3-dodecene,
11,12-dimethyltetracyclo[4.4.0.1$^{2,5}$.1$^{7,10}$]-3-dodecene,
2,7,9-trimethyltetracyclo[4.4.0.1$^{2,5}$.1$^{7,10}$]-3-dodecene,
9-ethyl-2,7-dimethyltetracyclo[4.4.0.1$^{2,5}$.1$^{7,10}$]-3-dodecene,
9-isobutyl-2,7-dimethyltetracyclo-[4.4.0.1$^{2,5}$.1$^{7,10}$]-3-dodecene,
9,11,12-trimethyltetracyclo-[4.4.0.1$^{2,5}$.1$^{7,10}$]-3-dodecene,
9-ethyl-11,12-dimethyltetracyclo-[4.4.0.1$^{2,5}$.1$^{7,10}$]-3-dodecene,
9-isobutyl-11,12-dimethyltetracyclo-[4.4.0.1$^{2,5}$.1$^{7,10}$]-3-dodecene,
5,8,9,10-tetramethyltetracyclo-[4.4.0.1$^{2,5}$.1$^{7,10}$]-3-dodecene,
8-methyltetracyclo[4.4.0.1$^{2,5}$.1$^{7,10}$]-3-dodecene,
8-ethyltetracyclo[4.4.0.1$^{2,5}$.1$^{7,10}$]-3-dodecene,
8-propyltetracyclo[4.4.0.1$^{2,5}$.1$^{7,10}$]-3-dodecene,
8-hexyltetracyclo[4.4.0.1$^{2,5}$.1$^{7,10}$]-3-dodecene,
8-stearyltetracyclo[4.4.0.1$^{2,5}$.1$^{7,10}$]-3-dodecene,
8,9-dimethyltetracyclo[4.4.0.1$^{2,5}$.1$^{7,10}$]-3-dodecene,
8-ethyl-9-methyltetracyclo[4.4.0.1$^{2,5}$.1$^{7,10}$]-3-dodecene,
8-chlorotetracyclo[4.4.0.1$^{2,5}$.1$^{7,10}$]-3-dodecene,
8-bromotetracyclo[4.4.0.1$^{2,5}$.1$^{7,10}$]-3-dodecene,
8-fluorotetracyclo[4.4.0.1$^{2,5}$.1$^{7,10}$]-3-dodecene,
8,9-dichlorotetracyclo[4.4.0.1$^{2,5}$.1$^{7,10}$]-3-dodecene,
8-cyclohexyltetracyclo[4.4.0.1$^{2,5}$.1$^{7,10}$]-3-dodecene,
8-isobutyltetracyclo[4.4.0.1$^{2,5}$.1$^{7,10}$]-3-dodecene,
8-butyltetracyclo[4,4,0,1$^{2,5}$.1$^{7,10}$]-3-dodecene,
8-ethylidenetetracyclo[4.4.0.1$^{2,5}$.1$^{7,10}$]-3-dodecene,
8-ethylidene-9-methyltetracyclo[4.4.0.1$^{2,5}$.1$^{7,10}$]-3-dodecene,
8-ethylidene-9-ethyltetracyclo[4.4.0.1$^{2,5}$.1$^{7,10}$]-3-dodecene,
8-ethylidene-9-isopropyl-tetracyclo-[4.4.0.1$^{2,5}$.1$^{7,10}$]-3-dodecene,
8-ethylidene-9-butyl-tetracyclo[4.4.0.1$^{2,5}$.1$^{7,10}$]-3-dodecene,
8-n-propylidene-tetracyclo[4.4.0.1$^{2,5}$.1$^{7,10}$]-3-dodecene,
8-n-propylidene-9-methyltetracyclo-[4.4.0.1$^{2,5}$.1$^{7,10}$]-3-dodecene,
8-n-propylidene-9-ethyltetracyclo-[4.4.0.1$^{2,5}$.1$^{7,10}$]-3-dodecene, 8-n-propylidene-9-isopropyltetracyclo-[4.4.0.1$^{2,5}$.1$^{7,10}$]-3-dodecene,
8-n-propylidene-9-butyltetracyclo-[4.4.0.1$^{2,5}$.1$^{7,10}$]-3-dodecene,
8-isopropylidenetetracyclo[4.4.0.1$^{2,5}$.1$^{7,10}$]-3-dodecene,
8-isopropylidene-9-methyltetracyclo-[4.4.0.1$^{2,5}$.1$^{7,10}$]-3-dodecene,
8-isopropylidene-9-ethyltetracyclo-[4.4.0.1$^{2,5}$.1$^{7,10}$]-3-dodecene,
8-isopropylidene-9-isopropyltetracyclo-[4.4.0.1$^{2,5}$.1$^{7,10}$]-3-dodecene, and
8-isopropylidene-9-butyltetracyclo-[4.4.0.1$^{2,5}$.1$^{7,10}$]-3-dodecene.

Hexacyclo[6.6.1.1$^{3,6}$.1$^{10,13}$.0$^{2,7}$.0$^{9,14}$]-4-heptadecenes:
hexacyclo[6.6.1.1$^{3,6}$.1$^{10,13}$.0$^{2,7}$.0$^{9,14}$]-4-heptadecene

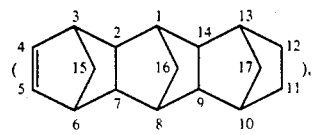

12-methylhexacyclo-[6.6.1.1$^{3,6}$.1$^{10,13}$.0$^{2,7}$.0$^{9,14}$]-4-heptadecene,
12-ethylhexacyclo[6.6.1.1$^{3,6}$.1$^{10,13}$.0$^{2,7}$.0$^{9,14}$]-4-heptadecene,
12-isobutylhexacyclo-[6.6.1.1$^{3,6}$.1$^{10,13}$.0$^{2,7}$.0$^{9,14}$]-4-heptadecene, and
1,6,10-trimethyl-12-isobutylhexacyclo-[6.6.1.1$^{3,6}$.1$^{10,13}$.0$^{2,7}$.0$^{9,14}$]-4-heptadecene.

Octacyclo[8.8.0.1$^{2,9}$.1$^{4,7}$.1$^{11,18}$.1$^{13,16}$.0$^{3,8}$.0$^{12,17}$]-5-dococenes:
octacyclo-[8.8.0.1$^{2,9}$.1$^{4,7}$.1$^{11,18}$.1$^{13,16}$.0$^{3,8}$.0$^{12,17}$]-5-docoene

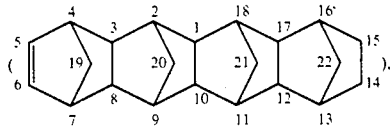

15-methyloctacyclo-[8.8.0.1$^{2,9}$.1$^{4,7}$.1$^{11,18}$.1$^{13,16}$.0$^{3,8}$.0$^{12,17}$]-5-docoene, and
15-ethyloctacyclo-[8.8.0.1$^{2,9}$.1$^{4,7}$.1$^{11,18}$.1$^{13,16}$.0$^{3,8}$.0$^{12,17}$]-5-docoene.

Pentacyclo[6.6.1.1$^{3,6}$.0$^{2,7}$.0$^{9,13}$]-4-hexadecenes:
pentacyclo[6.6.1.1$^{3,6}$.0$^{2,7}$.0$^{9,13}$]-4-hexadecene

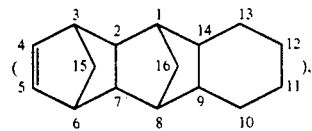

1,3-dimethyl-pentacyclo[6.6.1.1$^{3,6}$.0$^{2,7}$.0$^{9,14}$]-4-hexadecene,
1,6-dimethyl-pentacyclo[6.6.1.1$^{3,6}$.0$^{2,7}$.0$^{9,14}$]-4-hexadecene, and
15,16-dimethyl-pentacyclo[6.6.1.1$^{3,6}$.0$^{2,7}$.0$^{9,14}$]-4-hexadecene.

Heptacyclo-5-eicosenes:
heptacyclo[8.7.0.1$^{2,9}$.1$^{4,7}$.0$^{11,17}$.0$^{3,8}$.0$^{12,16}$]-5-eicosene

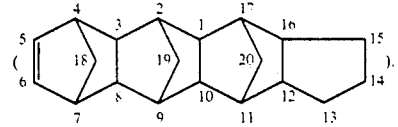

Heptacyclo-5-heneicosenes:
heptacyclo[8.8.0.1$^{2,9}$.1$^{4,7}$.0$^{11,18}$.0$^{3,8}$.0$^{12,17}$]-5-heneicosene

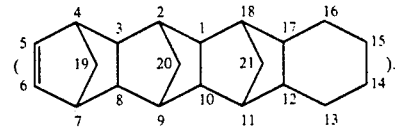

Tricyclo-[4.3.0.1$^{2,5}$]-3-decenes:
tricyclo[4.3.0.1$^{2,5}$]-3-decene

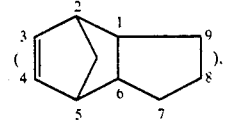

2-methyltricyclo[4.3.0.1$^{2,5}$]-3-decene, and
5-methyl-tricyclo[4.3.0.1$^{2,5}$]-3-decene.

Tricyclo[4.4.0.1$^{2,5}$]-3-undecenes:
tricyclo-[4.4.0.1$^{2,5}$]-3-undecene

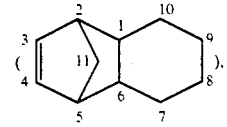

and
10-methyl-tricyclo-[4.4.0.1$^{2,5}$]-3-undecene.

Pentacyclo[6.5.1.1$^{3,6}$.0$^{2,7}$.0$^{9,13}$]-4-pentadecene:
pentacyclo[6.5.1.1$^{3,6}$.0$^{2,7}$.0$^{9,13}$]-4-pentadecene

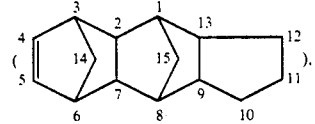

1,3-dimethyl-pentacyclo[6.5.1.1$^{3,6}$.0$^{2,7}$.0$^{9,13}$]-4-pentadecene, 5
1,6-dimethyl-pentacyclo[6.5.1.1$^{3,6}$.0$^{2,7}$.0$^{9,13}$]-4-pentadecene, and
14,15-dimethyl-pentacyclo[6.5.1.1$^{3,6}$.0$^{2,7}$.0$^{9,13}$]-4-pentadecene.

Pentacyclopentadecadienes:
pentacyclo[6.5.1.1$^{3,6}$.0$^{2,7}$.0$^{9,13}$]-4,10-pentadecadiene

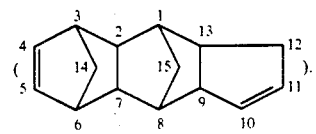

Pentacyclo[4.7.0.1$^{2,5}$.1$^{9,12}$.0$^{8,13}$]-3-pentadecenes:
pentacyclo[4.7.0.1$^{2,5}$.1$^{9,12}$.0$^{8,13}$]-3-pentadecene

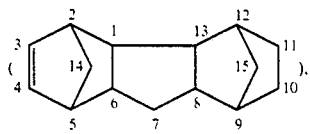

and methyl-substituted pentacyclo-[4.7.0.1$^{2,5}$.1$^{9,12}$.0$^{8,13}$]-3-pentadecene.

Heptacyclo[7.8.0.1$^{3,6}$.0$^{2,7}$.1$^{10,17}$.0$^{11,16}$.1$^{12,15}$]-4-eicosenes:

heptacyclo-[7.8.0.1$^{3,6}$.0$^{2,7}$.1$^{10,17}$.0$^{11,16}$.1$^{12,15}$]-4-eicosene

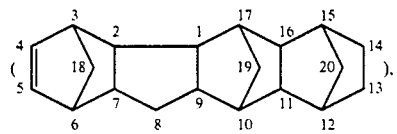

and dimethyl-substituted heptacyclo-[7.8.0.1$^{3,6}$.0$^{2,7}$.1$^{10,17}$.0$^{11,16}$.1$^{12,15}$]-4-eicosene.

Nonacyclo[9.10.1.1$^{4,7}$.1$^{13,20}$.1$^{15,18}$.0$^{2,10}$.0$^{3,8}$.0$^{12,21}$.0$^{14,19}$]-5-pentacosenes:

nonacyclo[9.10.1.1$^{4,7}$.1$^{13,20}$.1$^{15,18}$.0$^{2,10}$.0$^{3,8}$.0$^{12,21}$.0$^{14,19}$]-5-pentacosene

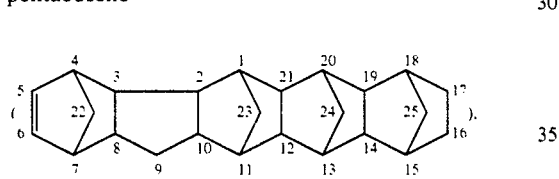

and trimethyl-substituted nonacyclo[9.10.1.1$^{4,7}$.1$^{13,20}$.1$^{15,18}$.0$^{2,10}$.0$^{3,8}$.0$^{12,21}$.0$^{14,19}$]-5-pentacosene.

Specific examples of the cycloolefin of the formula (II) include the following compounds.

5-phenyl-bicyclo[2.2.1]hept-2-ene

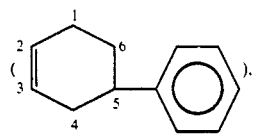

5-methyl-5-phenyl-bicyclo[2.2.1]hept-2-ene,
5-benzyl-bicyclo[2.2.1]hept-2-ene,
5-tolyl-bicyclo[2.2.1]hept-2-ene,
5-(ethylphenyl)-bicyclo[2.2.1]hept-2-ene,
5-(isopropylphenyl)-bicyclo[2.2.1]hept-2-ene,
1,4-methano-1,4,4a,9a-tetrahydrofluorene

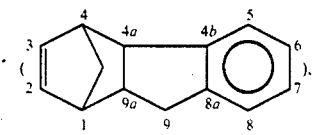

1,4-methano-1,4,4a,5,10,10a-hexahydroanthracene

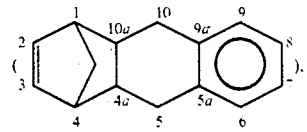

cyclopentadiene-acenaphthylene adduct

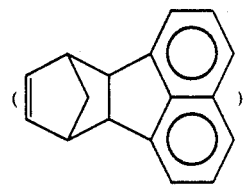

5-(α-naphthyl)-bicyclo[2.2.1]hept-2-ene

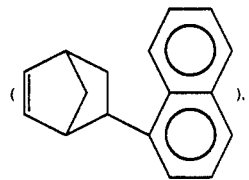

and 5-(anthracenyl)-bicyclo[2.2.1]hept-2-ene

The cycloolefin of the formula (I) can be easily prepared by reacting a corresponding cyclopentadiene with a corresponding olefin according to the Diels-Alder reaction.

The compound of the formula (II) is known per se.

In the present invention, the above cycloolefin and ethylene are reacted with each other in a mixed solvent comprising a hydrocarbon solvent (a) having a solubility parameter (δ value) of not less than 7.7 (cal/cm$^3$)$^{\frac{1}{2}}$, preferably not less than 8.0 (cal/cm$^3$)$^{\frac{1}{2}}$, and a hydrocarbon solvent (b) having a solubility parameter (δ value) of not more than 7.5 (cal/cm$^3$)$^{\frac{1}{2}}$, preferably not more than 7.4 (cal/cm$^3$)$^{\frac{1}{2}}$.

The mixing ratio (a/b) by volume of the above hydrocarbon solvent (a) and hydrocarbon solvent (b) differs to some extent depending upon the types of cycloolefins used and compositions of the copolymer. In general, however, said mixing ratio is preferably 90/10 to 50/50, more preferably 85/15 to 60/40.

The hydrocarbon solvent (a) having a solubility parameter (δ value) of not less than 7.7 (cal/cm$^3$)$^{\frac{1}{2}}$ is specifically selected from the following compounds.

| Solvent (a) | δ value |
| --- | --- |
| Ethylene dichloride | 0.8 |
| Methylene dichloride | 9.7 |
| Benzene | 9.2 |
| Toluene | 8.9 |
| Xylene | 8.8 |
| Decalin ® (decahydronaphthalene) | 8.8 |
| Cyclopentane | 8.7 |
| Cyclohexane | 8.2 |
| Methylcyclohexane | 7.8 |

The hydrocarbon solvent (b) having a solubility parameter (δ value) of not more than 7.5 $(cal/cm^3)^{\frac{1}{2}}$ is specifically selected from the following compounds and isomers.

| Solvent (b) | δ value |
| --- | --- |
| Heptane | 7.4 |
| Hexane | 7.3 |
| Pentane | 7.0 |
| Butane | 6.8 |
| Decane | 6.6 |

The above hydrocarbon solvents as a solvent (a) may be used alone or in combination, and the above hydrocarbon solvents as a solvent (b) may be also used alone or in combination.

The above hydrocarbon solvent (a) and hydrocarbon solvent (b) are preferably combined, e.g. as follows.

Cyclohexane-hexane
Cyclohexane-heptane
Cyclohexane-pentane
Cyclohexane-hexane isomer mixture
Toluene-hexane
Toluene-heptane
Toluene-pentane
Toluene-hexane isomer mixture In the present invention, the cycloolefin and ethylene are copolymerized in the presence of the mixed solvent comprising the above hydrocarbon solvent (a) and hydrocarbon solvent (b), whereby a decrease in viscosity of the polymerization system can be achieved, polymerization heat can be easily removed, uniformity in the system can be enhanced, and the movability of the polymerization liquids can be improved. Therefore, when it is attempted to produce a copolymer having the same molecular weight as those of conventional copolymers, said copolymer can be produced in a higher concentration. And, when it is attempted to produce a copolymer having the same polymer concentration as those of conventional copolymers, said copolymer can be produced so as to have a higher molecular weight.

In the present invention, a catalyst comprising a soluble vanadium compound and an organoaluminum compound is used to copolymerize ethylene and the cycloolefin.

The vanadium compound can be specifically selected from vanadium compounds of the formula, $VO(OR)_aX_b$ or $V(OR)_cX_d$ wherein R is a hydrocarbon group, $0 \leq a \leq 3$, $0 \leq b \leq 3$, $2 \leq a+b \leq 3$, $0 \leq c \leq 4$, $0 \leq d \leq 4$, and $3 \leq c+d \leq 4$, and adducts of these with electron donors. More specifically, examples of the vanadium compound are $VOCl_3$, $VO(OC_2H_5)Cl_2$, $VO(OC_2H_5)_2Cl$, $VO(O\text{-iso-}C_3H_7)Cl_2$, $VO(O\text{-n-}C_4H_9)Cl_2$, $VO(OC_2H_5)_3$, $VOBr_2$, $VCl_4$, $VOCl_2$, $VO(O\text{-n-}C_4H_9)_3$, $VOCl_3 \cdot 20C_8H_{17}OH$, etc.

The electron donor used to prepare said soluble vanadium catalyst component can be selected, for example, from oxygen-containing electron donors such as alcohols, phenols, ketones, aldehydes, carboxylic acids, esters of organic or inorganic acids, ethers, acid amides, acid anhydrides, alkoxysilanes etc., and nitrogen-containing electron donors such as ammonia, amines, nitriles, isocyanate, etc. Specific examples of the above electron donors are alcohols having 1 to 18 carbon atoms such as methanol, ethanol, propanol, pentanol, hexanol, octanol, dodecanol, octadecyl alcohol, oleyl alcohol, benzyl alcohol, phenylethyl alcohol, cumyl alcohol, isopropyl alcohol, isopropylbenzyl alcohol, etc.; phenols having 6 to 20 carbon atoms, which may have low alkyl, such as phenol, cresol, xylenol, ethylphenol, propylphenol, nonylphenol, cumylphenol, naphthol, etc.; ketones having 3 to 15 carbon atoms such as acetone, methyl ethyl ketone, methyl isobutyl ketone, acetophenone, benzophenone, benzoquinone, etc.; aldehydes having 2 to 15 carbon atoms such as acetaldehyde, propionaldehyde, octylaldehyde, benzaldehyde, tolualdehyde, naphthaldehyde, etc.; organic acid esters having 2 to 30 carbon atoms such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisate, n-butyl maleate, diisobutyl methylmalonate, di-n-hexyl cyclohexenecarboxylate, diethyl ester of Nadic acid, diisopropyl tetrahydrophthalate, diethyl phthalate, diisobutyl phthalate, di-n-butyl phthalate, di-2-ethylhexyl phthalate, γ-butyrolactone, δ-valerolactone, cumalin, phthalide, ethylene carbonate, etc.; acid halides having 2 to 15 carbon atoms such as acetyl chloride, benzoyl chloride, toluic acid chloride, anisic acid chloride, etc.; ethers having 2 to 20 carbon atoms such as methyl ether, ethyl ether, isopropyl ether, butyl ether, amyl ether, tetrahydrofuran, anisole, diphenyl ether, etc.; amides such as acetamide, benzoic acid amide, toluic acid amide, etc.; amines such as methylamine, ethylamine, diethylamine, tributylamine, piperidine, tribenzylamine, aniline, pyridine, picoline, tetramethylenediamine, etc.; nitriles such as acetonitrile, benzonitrile, tolunitrile, etc.; alkoxysilanes such as ethyl silicate, diphenyldimethoxysilane, etc.; and the like. Each of these electron donors may be used in combination with other.

The organoaluminum compound catalyst component can be selected from those having at least one Al-carbon bond in the molecule, such as:

(i) organoaluminum compounds of the formula, $R^{19}_rAl(OR^{20})_tH_pX_q$ wherein each of $R^{19}$ and $R^{20}$ is independently of the other a hydrocarbon having 1 to 15 carbon atoms, preferably 1 to 4 carbon atoms, X is halogen, $0 \leq r \leq 3$, $0 \leq t < 3$, $0 \leq p < 3$, $0 \leq q < 3$, and $r+t+p+q=3$, and (ii) complex alkylation compounds comprising a metal of the group I of the periodic table and aluminum, which has the formula of $M^1AlR^{19}_4$ wherein $M^1$ is Li, Na or K and $R^{19}$ is as defined above.

The following compounds come under the organoaluminum compounds of the above category (i).

Compounds of the formula, $R^{19}{}_u Al(OR^{20})_{3-u}$ wherein $R^{19}$ and $R^{20}$ are as defined above, and preferably, $1.5 \leq u < 3$.

Compounds of the formula, $R^{19}{}_r AlX_{3-r}$ wherein $R^{19}$ is as defined above, X is halogen and preferably, $0 < r < 3$.

Compounds of the formula, $R^{19}{}_v AlH_{3-v}$ wherein $R^{19}$ is as defined above, and preferably, $2 \leq v < 3$.

Compounds of the formula, $R^{19}{}_r Al(OR^{20})_t X_q$ wherein $R^{19}$ and $R^{20}$ are as defined above, X is halogen, $0 < r \leq 3$, $0 \leq t < 3$, $0 \leq q < 3$, and $r + t + q = 3$.

Specific examples of the category (i) are (1) trialkylaluminums such as triethylaluminum, tributylaluminum, etc.; trialkenylaluminums such as triisopropenylaluminum, etc.; dialkylaluminumalkoxides such as diethylaluminumethoxide, dibutylalminumbutoxide, etc.; alkylaluminumsesquialkoxides such as ethylaluminumsesquiethoxide, butylaluminumsesquibutoxide, etc.; and partially alkoxylated alkylaluminums having an average composition of the formula, $R^{19}{}_{2.5} Al(OR^{20})_{0.5}$; (2) partially halogenated alkylaluminums selected from dialkylaluminum halides such as diethylaluminum chloride, dibutylaluminum chloride, diethylaluminum bromide, etc.; alkylaluminum sesquihalides such as ethylaluminum sesquichloride, butylaluminum sesquichloride, isobutylaluminum sesquichloride, ethylaluminum sesquibromide, etc.; alkylaluminum dihalides such as ethylaluminum dichloride, propylaluminum dichloride, butylaluminum dibromide, etc.; and the like; (3) partially hydrogenated alkylaluminums selected from dialkylaluminum dihydrides such as diethylaluminum hydride, dibutylaluminum hydride, etc.; alkylaluminum dihydrides such as ethylaluminum dihydride, propylaluminum dihydride, etc.; and the like; and (4) partially alkoxylated and halogenated alkylaluminums such as ethylaluminum ethoxychloride, butylaluminum butoxychloride, ethylaluminum ethoxybromide, etc. Further, there may be used compounds similar to those of the category (i) such as organoaluminum compounds in which two or more aluminum atoms are bonded to each other through oxygen or nitrogen. Specific examples of such compounds are:

$(C_2H_5)_2AlOAl(C_2H_5)_2$, $(C_4H_9)_2AlOAl(C_2H_9)_2$,

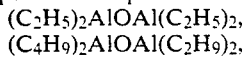

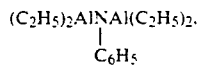

and the like.

Examples of the compounds of the above category (ii) are $LiAl(C_2H_5)_4$, $LiAl(C_7H_{15})_4$, etc. Of these compounds, particularly preferred are an alkylaluminum halide, an alkylaluminum dihalide or a mixture of these.

In the present invention, ethylene and at least one cycloolefins of the formula (I) or (II) are copolymerized, and optionally, an α-olefin having at least 3 carbon atoms may be copolymerized together. Such an α-olefin having at least 3 carbon atoms can be selected from α-olefins having 3 to 20 carbon atoms such as propylene, 1-butene, 4-methyl-1-pentene, 1-hexene, 1-octene, 1-decene, 1-dodecene, 1-tetradecene, 1-hexadecene, 1-octadecene, 1-eicosene, etc.

Other copolymerizable unsaturated monomer component may be copolymerized together as far as it does not impair the objects of the present invention. Specific examples of such a copolymerizable unsaturated monomer are cycloolefins such as cyclopentene, cyclohexene, 3-methylcyclohexene, cyclooctene, etc., nonconjugated dienes such as 1,4-hexadiene, 4-methyl-1,4-hexadiene, 5-methyl-1,4-hexadiene, 1,7-octadiene, cyclopentadiene, dicyclopentadiene, 5-ethylidene-2-norbornene, 5-vinyl-2-norbornene, etc., and the like. The amount of such a copolymerizable unsaturated monomer is less than the equimolar amount of the above cycloolefin component unit in the random copolymer to be formed.

In the production of the cycloolefin-based random copolymer, ethylene and the above cycloolefin of the formula (I) or (II) are copolymerized preferably by a continuous method. In this case, the concentration of the soluble vanadium compound to be fed to the polymerization system is not more than 10 times, preferably 1 to 7 times, more preferably 1 to 5 times, as high as the concentration of the soluble vanadium compound present in the polymerization system.

In the present invention, the atomic ratio (Al/V) of aluminum to vanadium atom in the polymerization system is not less than 2, preferably 2 to 50, particularly preferably 3 to 20.

Each of the said soluble vanadium compound and organoaluminum compound is generally diluted with the above hydrocarbon solvent or the above cycloolefin before feeding it. In this case, said soluble vanadium compound is preferably diluted until the above-specified concentration range is attained. The concentration of the organoaluminum compound is freely adjusted to not more than 50 times as high as that in the polymerization system before feeding it.

When the cycloolefin-based random copolymer is produced, the concentration of the soluble vanadium compound in the copolymerization system is generally 0.05 to 5 millimoles/lit., preferably 0.05 to 3 millimoles/lit.

Such copolymerization of ethylene and the olefin is carried out at a temperature of −50° to 100° C., preferably −30° to 80° C., more preferably −20° to 60° C.

The reaction time for the above copolymerization (an average residence time of a polymerization mixture in the case where a continuous polymerization method is employed) differs depending upon raw materials for the polymerization, concentrations of the catalyst components and temperatures. However, such a reaction time is generally 5 minutes to 5 hours, and preferably 10 minutes to 3 hours. The pressure for the copolymerization is generally 0 exclusive to 50 kg/cm², preferably 0 exclusive to 20 kg/cm². Further, in order to adjust the molecular weight of the copolymer, a chain transfer agent such as hydrogen may be present when the copolymerization is carried out.

When ethylene and the cycloolefin are subjected to the copolymerization to produce the cycloolefin-based random copolymer, it is desirable that the ethylene/cycloolefin molar ratio in feed is in a range of 99/1 to 1/99, preferably 90/10 to 10/90, more preferably 40/60 to 85/15.

Ethylene and the cycloolefin are copolymerized as described above, whereby a solution of the cycloolefin-based random copolymer is obtained. The concentration of the cycloolefin-based random copolymer in such a copolymer solution is generally 10 to 500 g/lit., preferably 10 to 300 g/lit. The copolymerization reaction of the present invention using the mixed solvent has a characteristic feature in that the above upper limit of the concentration can be made higher.

The cycloolefin-based random copolymer obtained as above is noncrystalline or crystalline. However, of these cycloolefin-based random copolymers obtained, preferred is the copolymer which has no DSC melting point and is noncrystalline when measured by X-ray diffractometry. Further, the ethylene/cycloolefin molar ratio of the cycloolefin-based random copolymer obtained according to the present invention is generally 95/5 to 30/70, preferably 90/10 to 40/60. The glass transition point (Tg) of said cycloolefin-based random copolymer is generally 10° to 240° C., preferably 20° to 200° C.

The present invention will be further detailed hereinbelow by reference to Examples, which, however, shall not limit the present invention.

EXAMPLE 1

Ethylene and tetracyclo[4.4.0.1$^{2,5}$.1$^{7,10}$]-3-dodecene (to be abbreviated as TCD-3 hereinafter) were continuously copolymerized in a cyclohexane/n-hexane mixed (65/35 vol %) solvent by the use of a reactor having a volume of 1 liter and being provided with a stirring vane. That is, a solution prepared by diluting TCD-3 with said mixed solvent was continuously charged into the reactor from the top of the reactor at a rate of 0.4 lit./hour such that the concentration of TCD-3 in the reactor was 120 g/lit. As a catalyst, a solution of VO(OC$_2$H$_5$)Cl$_2$ in the same mixed solvent as that specified above was continuously charged at a rate of 0.5 lit./hour such that the vanadium concentration in the reactor was 2.0 mmol/lit. (in this case, the concentration of vanadium being charged is 2.86 times as high as that in the reactor), and a solution of ethylaluminum sesquichloride [Al(C$_2$H$_5$)$_{1.5}$Cl$_{1.5}$] in the same mixed solvent as that specified above was also continuously charged at a rate of 0.4 lit./hour such that the aluminum concentration in the reactor was 16.0 mmol/lit. And said solvent was also continuously charged into the reactor at a rate of 0.7 lit./hour. On the other hand, a polymerization liquid was continuously withdrawn from the top of the reactor such that the polymerization liquid within the reactor was always maintained at 1 lit., i.e. the average residence time became 0.5 hour. Further, 100 lit./hour of ethylene, 10 lit./hour of nitrogen and 5.0 lit./hour of hydrogen were fed into the reactor through a bubbling tube. The polymerization was carried out at 20° C. by circulating a cooling medium through a jacket fitted externally to the reactor. The polymerization under the above conditions gives a polymerization reaction mixture containing an ethylene.TCD-3 random copolymer. The polymerization was terminated by adding a cyclohexane/isopropyl alcohol (1/1) mixed liquid to the polymerization liquid withdrawn from the top of the reactor. Then, an aqueous solution of 5 ml of concentrated sulfuric acid in 1 lit. of water and the polymerization liquid were brought into contact with each other by vigorous stirring with a homomixer to transfer a catalyst residue to a water phase. The polymerization liquid was then purified and separated by allowing this mixed solution to stand still, removing the water phase, and washing the remainder with water twice.

The resultant polymerization liquid was brought into contact with acetone, of which the amount was three times as large as that of the polymerization liquid, with vigorous stirring. A precipitated solid portion was collected by filtering, and fully washed with acetone. Thereafter, the solid portion was charged into acetone such that the amount of the solid portion was 40 g/lit., and subjected to an extraction of unreacted cycloolefin at 60° C. for 2 hours. Then, a solid portion was taken out by filtering, and dried under nitrogen atmosphere at 130° C. at a pressure of 350 mmHg for 24 hours.

According to the above procedures, the ethylene.TCD-3 copolymer was obtained at a rate of 362 g/hour (i.e. in a polymer concentration of 181 g/lit.).

The copolymer thus obtained had an ethylene content of 67.8 mol %, determined by $^{13}$C-NMR analysis, an intrinsic viscosity [$\eta$], measured in decalin at 135° C., of 0.51 dl/g, and an iodine value of 0.9.

Further, the above copolymer had a crystallinity, measured by X-ray diffractometry, of 0, and a Haze value, which is one of the standards of the transparency, of 3.7% when a 1 mm sheet thereof was measured with a hazemeter according to ASTM D 1003-52.

Concerning the glass transition temperature Tg, the above copolymer was also measured for a loss elastic modulus E" at a temperature elevation rate of 5° C./min with a Dynamic Mechanical Analyzer (DMA) supplied by Du Pont, and a peak area thereof was used as a base for determining the glass transition temperature. As a result, the above copolymer had a glass transition temperature Tg of 125° C. Further, in order to determine whether or not the copolymer had a melting point Tm, the copolymer was measured at a temperature elevation rate of 10° C./min between −120° C. and 400° C. with a DSC of 990 type supplied by Du Pont, and as a result, no melting curve (peak) based on Tm was observed.

The above copolymer was dissolved in the same mixed solvent as that described above (cyclohexane/n-hexane=65/35 vol %) such that the amount of the copolymer was 150 g/lit., and measured for a solution viscosity at 20° C. with a cone-and-plate viscometer to show 90 cp (centipoise).

Table 1 shows the results.

EXAMPLE 2 and COMPARATIVE EXAMPLE 1

Ethylene and TCD-3 were copolymerized by repeating Example 1 except for the conditions shown in Table 1.

Table 1 shows the results.

EXAMPLE 3 and COMPARATIVE EXAMPLE 2

Ethylene and 1,4-methano-1,4,4a,9a-tetrahydrofluorene (to be abbreviated as "MTHF" hereinafter) as a cycloolefin in lieu of TCD-3 were copolymerized by repeating Example 1 except for the conditions shown in Table 1.

Table 1 shows the results.

TABLE 1

| No. | Cycloolefin | Mixed solvent A/B | Volume ratio | Yield of polymer (polymer concentration) (g/l) | Basic properties of copolymer Cycloolefin content (molar ratio) | Intrinsic viscosity (dl/g) | Solution viscosity (*Note 1) (CP. at 20° C.) |
|---|---|---|---|---|---|---|---|
| Ex. 1 | TCD-3 | cyclohexane/n-hexane | 65/35 | 181 | 32.2 | 0.51 | 90 |
| Ex. 2 | TCD-3 | cyclohexane/n-hexane | 75/25 | 173 | 33.2 | 0.47 | 102 |
| CEx. 1 | TCD-3 | cyclohexane/n-hexane | 100/0 | 112 | 34.1 | 0.46 | 173 |
| Ex. 3 | MTHF | toluene/n-hexane | 65/35 | 201 | 30.5 | 0.55 | 98 |
| CEx. 2 | MTHF | toluene/n-hexane | 100/0 | 109 | 31.2 | 0.47 | 165 |

Note 1: Solution viscosity obtained by measuring a polymer obtained by again dissolving the resultant copolymer in a solvent (or mixed solvent) having the same composition as that of the solvent in corresponding Example (= concentration of 150 g/l) at 20° C. A mixed solvent gives a decrease in viscosities of polymer solutions.

What is claimed is:

1. A process for the production of a cycloolefin-based random copolymer, which comprises:
(A) copolymerizing (a) ethylene and (b) at least one cycloolefin selected from the group consisting of an unsaturated monomer of the formula (I)

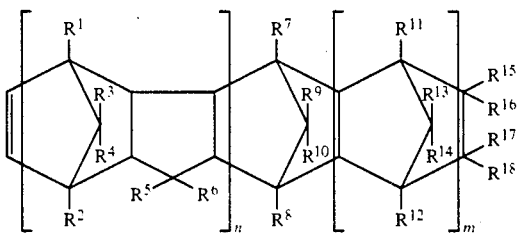

wherein:
n is 0 or 1,
m is 0 or a positive integer,
each of $R^1$ to $R^{18}$ is independently a hydrogen atom, a halogen atom or a hydrocarbon group, two of $R^{15}$ to $^{18}$ may be bonded to each other to form a monocyclic or polycyclic ring which may have a double bond, and
$R^{15}$ and $R^{16}$, or $R^{17}$ and $R^{18}$, may together form an alkylidene group, and
an unsaturated monomer of the formula (II)

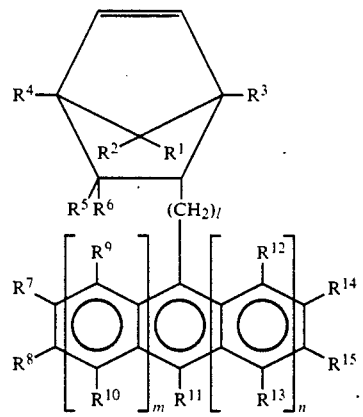

wherein:
l is 0 or an integer of not less than 1,
m and n are 0, 1 or 2,
each of $R^1$ to $R^{15}$ is independently a hydrogen atom, a halogen atom, an aliphatic hydrocarbon group, an aromatic hydrocarbon group or an alkoxy group, and
$R^5$ (or $R^6$) and $R^9$ (or $R^7$) may be bonded to each other through an alkylene group having 1 to 3 carbon atoms or may be bonded to each other directly through no group,
(B) in the presence of a catalyst comprising a vanadium compound soluble in a mixed solvent described below and an organoaluminum compound,
(C) in a mixed solvent comprising (a) a hydrocarbon-based solvent having a solubility parameter (δ value) of not less than 7.7 $(cal/cm^3)^{\frac{1}{2}}$ and (b) a hydrocarbon-based solvent having a solubility parameter (δ value) of not more than 7.5 $(cal/cm^3)^{\frac{1}{2}}$, the mixed solvent having a volume ratio (a)/(b) of 90/10 to 50/50.

2. A process according to claim 1, wherein the unsaturated monomer of the formula (I) is selected from the group consisting of bicyclo[2,2,1]hept-2-enes, tetracyclo-[4.4.0.1$^{2,5}$.1$^{7,10}$]-3-dodecenes, hexacyclo-[6.6.1.1$^{3,6}$.1$^{10,13}$.0$^{2,7}$.0$^{9,14}$]-4-heptadecenes, octacyclo[8.8.0.1$^{2,9}$.1$^{4,7}$.1$^{11,18}$.1$^{13,16}$.0$^{3,8}$.0$^{12,17}$]-5-docosenes, pentacyclo[6.6.1.1$^{3,6}$.0$^{2,7}$.0$^{9,14}$]-4-hexadecenes, heptacyclo-5-eicosenes, heptacyclo-5-heneicosenes, tricyclo[4,3,0,1$^{2,5}$]-3-decenes, tricyclo[4.4.0.1$^{2,5}$]-3-undecenes, pentacyclo-[6.5.1.1$^{3,6}$.0$^{2,7}$.0$^{9,13}$]-4-pentadecenes, pentacyclopentadecadienes, pentacyclo-[4.7.0.1$^{2,5}$.0$^{8,13}$.1$^{9,12}$]-3-pentadecenes, heptacyclo[7.8.0.1$^{3,6}$.0$^{2,7}$.1$^{10,18}$.0$^{11,16}$.1$^{12,15}$]-4-eicosenes, and Nonacyclo-]9.10.1.1.4.7.0$^{3,8}$.0$^{2,10}$.0$^{12,21}$.1$^{13,20}$.0$^{14,19}$.1$^{15,18}$]-5-pentacosenes.

3. A process according to claim 1, wherein the unsaturated monomer of the Formula (II) is selected from the group consisting of 5-phenyl-bicyclo[2.2.1]hept-2-ene, 5-methyl-5-phenylbicyclo[2.2.1]hept-2-ene, 5-benzylbicyclo[2,2,1]hept-2-ene, 5-tolylbicyclo[2.2.1]hept-2-ene, 5-(ethylphenyl)-bicyclo[2.2.1]hept-2-ene, 5-(isopropylphenyl)-bicyclo[2.2.1]hept-2-ene, 1,4-methano-1,4,4a,4a-tetrahydrofluorene, 1,4-methano-1,4,4a,5,10,-10a-hexahydroanthracene, a cyclopentadieneacenaphthylene adduct, 5-(α-naphthyl)-bicyclo[2.2.1-]hept-2-ene and 5-(anthracentyl)-bicyclo[2.2.1]hept-2-ene.

4. A process according to claim 1, wherein the ethylene and the cycloolefin are copolymerized in an ethylene/cycloolefin molar ratio of about 99/1 to about 1/99.

5. A process according to claim 1, wherein the ethylene and the cycloolefin are copolymerized in an ethylene/cycloolefin molar ratio of about 90/10 to about 10/90.

6. A process according to claim 1, wherein the hydrocarbon-based solvent (a) having a higher solubility parameter has a δ value of not less than 8.0 (cal/cm$^3$)$^{\frac{1}{2}}$.

7. A process according to claim 1, wherein the hydrocarbon-based solvent (a) having a higher solubility parameter is selected from the group consisting of ethylene dichloride, methylene dichloride, benzene, toluene, xylene, decahydronaphthalene, cyclopentane, cyclohexane and methylcyclohexane.

8. A process according to claim 1, wherein the hydrocarbon-based solvent (b) having a lower solubility parameter has a δ value of not more than 7.4 (cal/cm$^3$)$^{\frac{1}{2}}$.

9. A process according to claim 1, wherein the hydrocarbon-based solvent (b) having a lower solubility parameter is selected from the group consisting of heptane, hexane, pentane, butane and decane.

10. A process according to claim 1, wherein the volume ratio (a/b) between the hydrocarbon-based solvent (a) having a higher solubility parameter and the hydrocarbon-based solvent (b) having a lower solubility parameter is from about 85/15 to about 60/40.

11. A process according to claim 1, wherein the cycloolefin-based random copolymer produced has an ethylene unit/cycloolefin unit molar ratio of about 40/60 to about 85/15.

* * * * *